United States Patent [19]

Farkas et al.

[11] Patent Number: 5,022,293

[45] Date of Patent: Jun. 11, 1991

[54] METHOD AND WORKING MACHINE FOR PRODUCING SURFACES OF NON-CIRCULAR BUT REGULAR CROSS SECTIONS

[75] Inventors: Jozsef Farkas, Budapest; Sandor Vekony; Sandorne Vekony, both of Miskolc; Erno Csovak; Sandor Fodor, both of Budapest, all of Hungary

[73] Assignee: Innofinance Altalanos Innovacios Penzintezet, Budapest, Hungary

[21] Appl. No.: 301,758

[22] PCT Filed: Apr. 24, 1987

[86] PCT No.: PCT/HU87/00019

§ 371 Date: Apr. 21, 1989

§ 102(e) Date: Apr. 21, 1989

[87] PCT Pub. No.: WO88/08346

PCT Pub. Date: Nov. 3, 1988

[51] Int. Cl.⁵ .............................................. B23B 5/44
[52] U.S. Cl. ......................................... 82/1.11; 82/18; 82/19
[58] Field of Search ........................... 82/1.11, 18, 19

[56] References Cited

U.S. PATENT DOCUMENTS

| | | | |
|---|---|---|---|
| 3,593,603 | 7/1971 | Gellert | 82/18 |
| 3,595,108 | 7/1971 | Prescsak | |
| 3,978,766 | 9/1976 | Brennon | 82/18 |
| 4,564,914 | 6/1986 | Ballough | 82/18 |
| 4,648,295 | 3/1987 | Ley et al. | 82/18 |
| 4,651,599 | 3/1987 | Ley | 82/18 |
| 4,653,360 | 3/1987 | Compton | 82/18 |

FOREIGN PATENT DOCUMENTS 1752236 5/1971 Fed. Rep. of Germany .
0167643 11/1978 Hungary .
8701640 3/1987 World Int. Prop. O. ............. 82/18

Primary Examiner—Frederick B. Schmidt
Assistant Examiner—Blynn Shideler
Attorney, Agent, or Firm—Young & Thompson

[57] ABSTRACT

A method for producing workpieces with surfaces of non-circular but regular cross-sections with a working tool, wherein the workpiece is rotated about its own axis and the axis of the workpiece is rotated around an axis being eccentric to the axis of the workpiece and the two rotations being brought into a certain relationship according to the surface to be generated. According to the invention the axis of the workpiece is rotated mechanically independently from the eccentric axis and the relationship between the two rotations is established and maintained by an electrical control into which parameters of the surface to be produced are fed and with which the rotations of the axis are monitored and, in dependency of the fed-in and monitored factors, into rotational drives of the axes is interfered, respectively. A working machine for producing workpieces with surfaces of non-circular but regular cross-sections including an eccentric spindle (2) being rotationally driven, a main spindle (1) arranged rotationally within the eccentric spindle (2) and being rotationally driven around its own axis, and a working tool (6) driven for its feed motion. According to the invention the eccentric spindle (2) and the main spindle (1), separate motor devices (8,9) are connected and the feed motion of the working tool (6) is derived from the motor device (8) of the main spindle (1) by mechanical connection between them, and the two motor devices (8,9) are attached to each other by an electronic control circuitry with which a certain relationship between the rotations of the motor devices (8,9) is established in an adjustable manner.

6 Claims, 4 Drawing Sheets

METHOD AND WORKING MACHINE FOR PRODUCING SURFACES OF NON-CIRCULAR BUT REGULAR CROSS SECTIONS

FIELD OF THE INVENTION

The invention relates to a method for producing workpieces with surfaces of non-circular but regular cross sections with a working tool, wherein the workpiece is rotated around its own axis and the axis of the workpiece is rotated around an axis being eccentric to the axis of the workpiece and the two rotations are brought into a certain relationship according to the surface to be generated. The invention also relates to a working machine for producing workpieces with surfaces of non-circular but regular cross sections including an eccentric spindle being rotationally driven, a main spindle arranged rotationally within the eccentric spindle and being rotationally driven around its own axis and a working tool driven for its feed motion. The invention can preferably be used for inner and outer surfaces which are rotationally symmetrical and have closed, broken-lined circumferences.

BACKGROUND OF THE INVENTION

Workpieces having limiting surfaces as mentioned above can be produced with lathes as described in GB-PS 1.222.986 or on griding machines as described in HU-PS 167 643. In these solutions, the limiting surfaces being non-cylindrical ones are manufactured by rotating the workpiece around its own axis as well as the axis of the workpiece around a second axis which is eccentrical to that of the workpiece. The brake points of the broken line of the limiting surfaces i.e. the number of corners of the produced surface profil are determined by the ratio between the numbers of revolutions of the respective axes. Further to this, the feed motion of the working tool must also be brought into harmony with the rotation of the axes.

In the known methods, these taks are solved by a mechanical control mechanism. Therein, the parts of the mechanism, i.e. also the main spindle and the eccentric spindle of the known working machines in a constant mechanical forced coupling or interlocking with one another. Therefore, a fine adjustment or a fine correction in the pre-set values of the control can not be carried out. This disadvantage results in the smaller accuracy of the parts produces according to the known solutions. This will be made understandable also by the fact that the known control mechanism of the known solutions are built from a great number of gear wheels and other constructional parts having forced interconnections between one another. As it is well known, a connection between two gear wheels has a certain accuracy in transfering the angular displacement from one wheel to the other. If a more than one connection of such wheels are arranged in series one after the other, the errors of motion transfer of the interconnections will sum up to a considerable difference between the prescribed or set angle position and the real or actual angle position of the spindles of the working machine.

Nevertheless, the above mentioned mechanism is quite noisy, its efficiency of power transfer is low as well as its duration is short. The main spindle of the working machine can be driven only slowly since the mechanical control mechanism don't allow a higher rotational speed.

The above mentioned defficiencies are of higher importance when the up-to-date control systems such as the numerically controlled working machines are also taken into consideration. In the machine industry, it is a common thing to solve all control problems by electronical methods and devices. However, the known solutions for producing these surfaces with broken-line circumferences are not adapted for applying the known electronical procedures and devices.

A further shortcoming of the known solutions is in that they are not suitable for producing workpieces with outer or inner limiting surfaces with polygonal profils generated by spiral-formed generatrix. The surfaces of the workpieces produced by the previous solutions can have only straight-lined generatrix.

ESSENCE OF THE INVENTION

The main object of this invention is to provide a method and a working machine for producing any kind of polygonal profiles with which the deficiencies of the previous solutions can be eliminated, the modern control principals and means can be applied, and, thus, the production of these complicated and sophisticated parts can be made easier, simpler and more productive.

According to the improvement of the method in this invention, the axis of the workpiece is rotated mechanically independently from the eccentric axis and the relationship between the two rotational is established and maintained by an electrical control into which parameters of the surface to be produced are fed and with which the rotations of the axises are monitored and, in dependency of the fed-in and monitored factors, into rotational drives of the axises is interfered, respectively.

In a preferred realization in this invention, the working tool has a feed motion which is driven by being mechanically connected to the drive of the axis of the workpiece.

It is also preferable, that the relationship between the rotation of the axis of the workpiece and the rotation of the eccentric axis is so that a number of revolutions of the one is a whole-number multiple of that of the other. This ratio can be a fractional number or a continuously changing fractional number, too.

Further to this, it is also preferred in this invention, that in the course of establishing the relationship between the rotations, a point of reference is firstly determined and the rotations are then controlled for having this point of reference as zero point of their movement as well as for having the given relationship between them.

According to the improvement of the working machine in this invention, the eccentric spindle and the main spindle, separate motor devices are connected and the feed motion of the working tool is derived from the motor device of the main spindle by a mechanical connection between them, and the two motor devices are attached to each other by an electronic control circuitry with which a certain relationship between the rotations of the motor devices is established in an adjustable manner.

It is also preferable according to the invention that in the electronic control circuitry, a first closed-loop control circuit is attached to the motor device of the main spindle and a second closed-loop control circuit is attached to the motor device of the eccentric spindle, and the control circuits are interconnected by a stabilizer circuit for stabilising the adjusted relationship between the rotational of the motor devices.

In a preferred embodiment of the invention, each control circuit has a circuit for stabilizing the rotational speed of the motor device attached to it comprising a closed-loop leading a rotational signal of the motor device via a reference signalizer back to an input of the circuit.

It is also preferred in this invention, when a positioner circuit positioning the main spindle is arranged between an output and the input of the first control circuit.

Further to this, it can be preferred that a set-point adjuster influencing the rotation of the motor device of the main spindle is attached to the input of the first control circuit.

According to a preferred embodiment of this invention, in the first control circuit, a differentiating element, an integrator, an amplifier, the motor device and a pulse generator attached to the main spindle are connected in series, and the input of the control circuit is the differentiating element and its output is the pulse generator.

In a preferred embodiment of this invention, in the second control circuit, a differentiating element, an amplifier, the motor device and a pulse generator attached to the eccentric spindle are connected in series, and an input of the control circuit is the differentiating element connected to the summator of the stabilizer circuit and its output is the pulse generator.

It is still another preferred embodiment of this invention, wherein a central program unit is attached to the first control circuit the positioner circuit and the stabilizer circuit for determining the relationship between the rotations of the motor devices as well as the function of the circuits connected to it. Therein, it is preferred that the central program unit is connected with its inputs to the reference signalizers and the pulse generators of the control circuits and with its outputs, to the integrator and to the positioner circuit of the first control circuit as well as to the multiple-divider, the frequency-voltage converter and the counter element of the stabilizer circuit. The central program unit can finally be a programmable one which can preferably have entries for outer data.

SHORT DESCRIPTION OF THE DRAWINGS

Further objects and details of this invention will be described hereinafter with reference to the accompanying drawing on the basis of preferred embodiments. In the drawing, FIG. 1 is a cinematic scheme of an embodiment of the working machine in this invention, FIG. 2 is a schematical wiring diagram of an embodiment of the electronic control circuitry in this invention, FIG. 3 shows the main spindle and the eccentric spindle of the embodiment in FIG. 1 in four different operational positions,

FIG. 4 and

FIG. 5 illustrate different workpieces with surfaces produced according to this invention.

DETAILED DESCRIPTION OF THE PREFERRED EMBODIMENT

Figure 1:
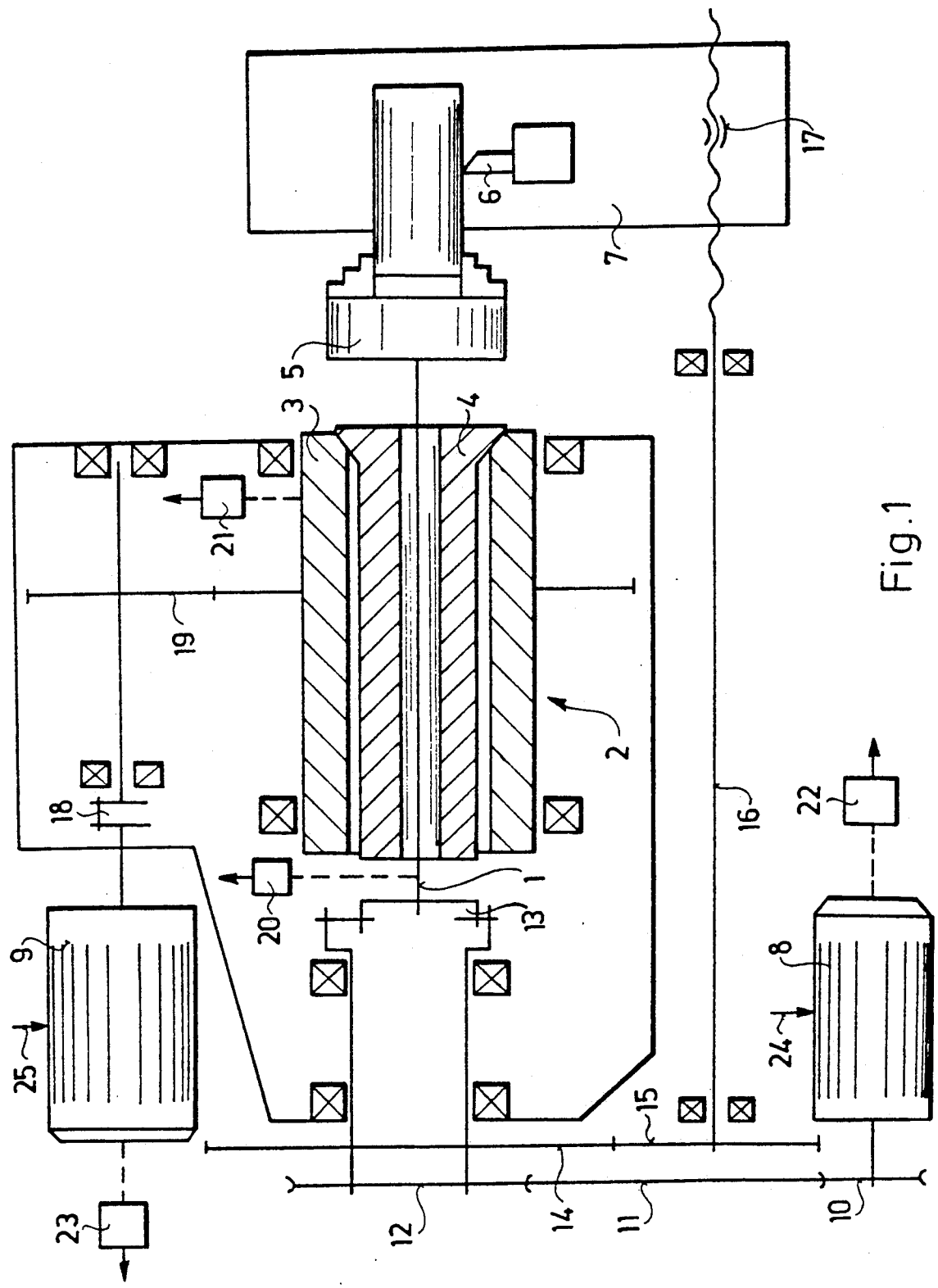

In FIG. 1, the cinematic scheme of an embodiment of the working machine of this invention is shown. As is usual with such kind of working machines known from the state of the art, it has a main spindle 1 and an eccentric spindle 2 which is assembled from two eccentric sleeves 3 and 4 which are twistable in respect to each other. With this, the eccentricity of spindle 2 can be adjusted to the desired value. When this value is set, sleeves 3 and 4 will be fixed to each other and from that time, they move together.

A workpiece 5 is fixed to main spindle 1, and a symmetry line of workpiece 5 falls in alignment with the axis of main spindle 1. A feeding device 7 is provided which is moveable for the feed motion of working tool 6.

In accordance with the invention, a separate drive is provided for main spindle 1 and eccentric spindle 2, respectively. Therefore, a separate motor device such as an electric motor 8 is provided for main spindle 1 and another motor device such as an electric motor 9 is provided for eccentric spindle 2. Through gear wheels 10, 11, and 12, motor 8 is connected to a clutch 13 transmitting the rotational motion from gear wheel 12 to main spindle 1 but allowing the eccentric motion of it. To gear wheel 12, a further gear wheel 14 is fixed which drives through a gear wheel 15 and a shaft 16 feeding device 7. As usual, a detachable connection 17 is provided between shaft 16 and feeding device 7.

Electric motor 9 of the drive of eccentric spindle 2 is attached through a flexible clutch 18 and a gear wheel 19 to outer sleeve 3 is eccentric spindle 2. Since the eccentricity of spindle 2 is provided by sleeves 3 and 4 having eccentric inner bores, outer sleeve 3 can have a cylindrical surface being pivoted in the housing of the working machine.

As it will be understood later, the positions of spindles 1 and 2 as well as of motors 8 and 9 have to be monitored and the rotation of motors 8 and 9 has to be influenced. For this, a pulse generator 20 is attached to main spindle 1, a pulse generator 21 to eccentric spindle 2, a reference signalizer 22 to motor 8 and a reference signalizer 23 to motor 9. The influence on motors 8 and 9 is suggested by arrows 24 and 25, respectively.

In the sense of the invention, a certain relationship is to be established and maintained between the rotations of spindles 1 and 2. This relationship depends on the parameters of the profile which has to be produced and it can be expressed by the ratio of the numbers of revolutions of spindles 1 and 2. If the ratio of the number of revolutions of main spindle 1 to the number of revolutions of eccentric spindle 2 is a whole number (i.e. the number of revolutions of eccentric spindle 2 is e.g. 6-times greater than that of main spindle 1), profiles with straight-lined generatrix will be produced. In a preferred embodiment, the number of "corners" of the produced regular polygon profile corresponds to the value of the ratio between the numbers of revolutions (thus, in the above example, a hexagon profile will be produced). If the ratio between the numbers of revolutions is a fractional number, a polygon surface generated by a spiral-formed generatrix will be produced. If the value of the ratio is continuously changing, the pitch of the spiral-formed generatrix will also change.

It is apparent that a quite sophisticated control is required for adjusting the rotational speeds of spindles 1 and 2 to each other and for maintaining the adjusted values when workpieces with said outer and inner polygon surfaces having the required trueness to shape and surface quality are to be produced. Further to this, the workpieces usually cannot be machined with one cut, thus, working tool 6 has to be brought back to the start of its cutting path with a great accuracy at the beginning of every new cut. In this position, the relation of the position of spindles 1 and 2 to each other must also be the same as previously.

Figure 2:
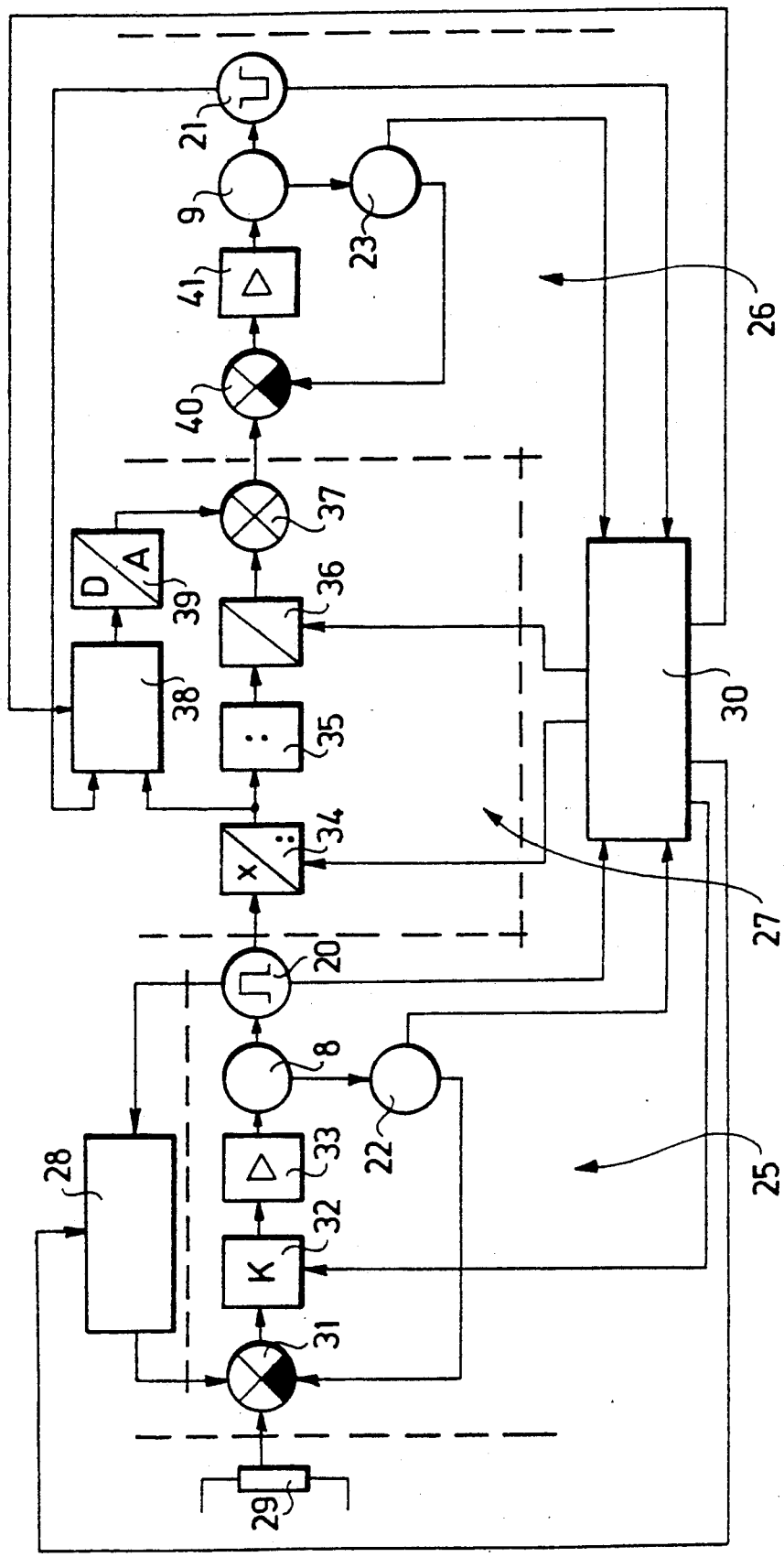

This quite complicated task can be solved by the electronic control circuitry in this invention as shown in FIG. 2. With this circuitry, motors 8 and 9 of the drives of main spindle 1 and eccentric spindle 2 are attached to each other.

The electronic control circuitry as shown in FIG. 2 has a first closed-loop control circuit 25 and a second closed-loop control circuit 26. Between them, a stabilizer circuit 27 is interconnected. To the first control circuit 25, a positioner circuit 28 for positioning main spindle 1 as well as a set-point adjuster 29 are attached. Further to this, a central program unit 30 is provided in the electronic control circuitry with which the function of first control circuit 25, stabilizer circuit 27 and positioner circuit 28 will be determined. These greater parts of the electronic circuitry are divided from each other by dotted lines.

The set-point adjuster 29 is for example a potentiometer which is adjustable from outside the working machine by hand. It is connected to an input of first control circuit 25 which is a differentiating element 31. To this, an integrator 32, an amplifier 33, motor 8 and pulse generator 20 are connected in series. The closed-loop is provided between reference signalizer 22 attached to motor 8 and differentiating element 31.

An input of stabilizer circuit 27 is a multiplier-divider 34 to which a divider 35, a frequency-voltage converter 36 and, as an outlet, a summator 37 are connected in series. Stabilizer circuit 27 also has a reversible counter element 38, an output of which is connected through a digital-analogue converter 39 to summator 37. A first direct input of counter element 38 is connected to an output of multiplier-divider 34 and its second inverse input to an output of second control circuit 26 which is pulse generator 21 attached to eccentric spindle 2.

Summator 37 of stabilizer circuit 37 is connected to a differentiating element 40 which is an input of second control circuit 26. To this, an amplifier 41, motor 9 and pulse generator 21 are connected in series. In the circuit 26, the closed-loop is between reference signalizer 23 attached to the motor 9 and differentiating element 40.

Central program unit 30 is essentially a programmable sequence circuit giving commands according to its program to the components of the circuitry attached to it. On its inputs, pulse generator 20 and reference signalizer 22 of first control circuit 25 as well as pulse generator 21 and reference signalizer 23 of second control circuit 26 are lain. Outputs of program unit 30 are connected to integrator 32 of first control circuit 32, to positioner circuit 28, as well as to multiplier-divider 34, frequency-voltage converter 36 and counter 38 of stabilizer circuit 27.

For describing the function of this embodiment of the invention as well as the realization of the method as in this invention, reference is taken to FIGS. 3a, 3b, 3c and 3d, wherein main spindle 1 and eccentric spindle 2 are shown in four different operational positions.

Figure 3:
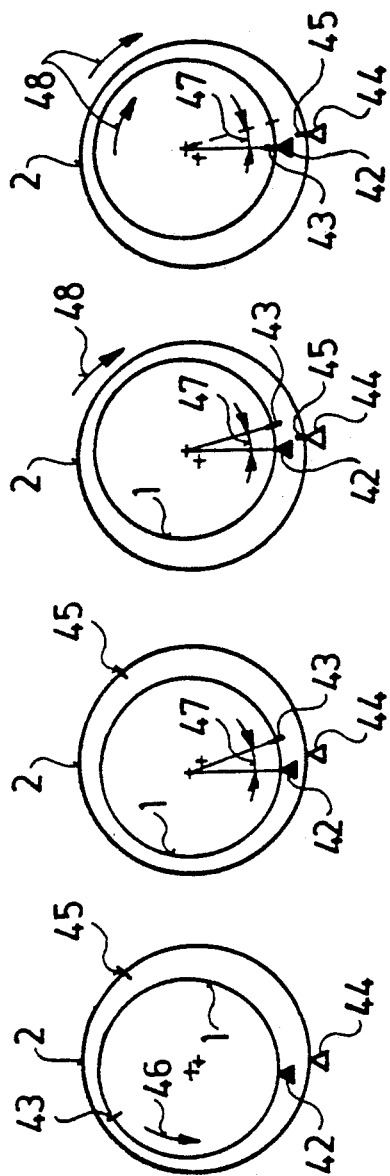

As mentioned above, the system must be brought into a starting position first, which must be reproduceable later. For this, a reference point 42 standing still and a reference point 43 moving with main spindle 1 as well as a reference point 44 standing still and a reference point 45 moving with eccentric spindle 2 are chosen. The positions of moving reference points 43 and 44 depend on the technology required for the given workpiece 5 and the machine routine. Thereafter, main spindle 1 will slowly be rotated (arrow 46) against the operational rotational direction which will be used when machining workpiece 5. In the course of this, moving reference point 43 will fall into alignement with standing reference point 42 but main spindle 1 will further be rotated by an angle 47. In this position as shown in FIG. 3b, main spindle 1 will be stopped. After this, eccentric spindle 2 will be rotated with slow motion in direction 48 which is the same as the rotational direction during the operation of the working machine. In the course of this, moving reference point 45 will fall into alignment with standing reference point 44 of eccentric spindle 2 which will be stopped in this position as shown in FIG. 3c. This is the starting position of spindles 1 and 2 which can always be occupied before starting the cutting operation.

When a spiral-formed generatrix is used for the profile to be produced, detachable connection 17 of feeding device 7 will be closed for being feeding device 7 in the starting position or, in the case of numerically controlled feeding shaft 16, it will be synchronized to this starting position. But when a polygon profile with straight line generatrix is to be produced, the starting position of feeding device need not be brought into synchronization with the starting position of spindles 1 and 2.

Thereafter, the synchronized operational rotation of spindles 1 and 2 can be started. Firstly, main spindle 1 will rotate in operational direction 48 with angle 47 until its standing reference point 42, where it will generate a reference pulse in pulse generator 20 which will start the movement of eccentric spindle 2 (FIG. 3d). Now, spindles 1 and 2 rotate with the operational speeds of revolutions.

This synchronization and positioning are controlled by the electronic control circuitry. Central program unit 30 charges positioner circuit 28 with a constant value. Positioner circuit 28 is essentially a chain connection of a counter charged from outward by program unit 30 and a digital-analogue converter. Positioner circuit 28 gives through the D/A converter a positive or negative direct voltage control signal onto the input of differentiating element 31. The circuit of integrator 32, amplifier 33 and the closed-lop with reference signalizer 22 accelerates main spindle 1 to a rotational speed which is proportional to the control signal. In the course of this, pulse generator 20 monitors the rotation of main spindle 1. Pulse generator 20 gives a 0 signal when moving reference point 42 reaches standing reference point 42. Until then, the input of positioner circuit 28 (counter) is prohibited and, thus, main spindle 1 rotates with a constant speed. After reaching reference points 42 and 43 the alignement position, the signals of pulse generator 20 will be delivered to the counter of positioner circuit 28 and its content will be reduced. The D/A converter of circuit 28 reduces the basic signal proportionally to the content of the counter, thus, main spindle 1 will slow down and stop exactly by angle 47 away from reference point 41 (see FIG. 3b).

For bringing eccentric spindle 2 in starting position, too, central program unit 30 charges reversible counter 38 with a constant value. On the output of digital-analogue converter 39 attached to counter 38 appears a direct voltage with right sense which is proportional with the constant value. This reaches through summator 37 the differentiating element 40. In the same time, the function of the multiplier-divider 34 and frequency-voltage converter 35 as well as both inputs of reversible counter 38 are prohibited by program unit 30. The signal from differentiating element 40 through amplifier 41 will rotate motor 9 of eccentric spindle 2 which will be influenced by the closed-loop through reference signalizer 23 attached to motor 9. Pulse generator 21 gives a 0 signal in the alignment position of reference points 44 and 45, program unit 30 gives free the inputs of counter 38 and, for the duration of the 0 signal, resets reversible counter 38. Thus, after the starting position, the number of pulses delivered by pulse generator 21 is proportional to the angular displacement.

After this, the synchronized rotation of spindles 1 and 2 can start since they are in their starting or reference position. Main spindle will accelerate to a rotational speed which is proportional to the voltage delivered by set-point adjuster 29 which, for example, is adjusted by hand from outside the working machine. After main spindle 1 reaches reference point 42 (see FIG. 3d), pulse generator 20 delivers the 0 signal which reaches central program unit 30 and multiplier-divider 34 only since positioner circuit 38 is no more in operation. With the aid of integrator 32, the torque necessary for the adequate acceleration of main spindle 1 without any overshot will be provided.

With multiplier-divider 34, the relation between the rotational speeds and positions of spindles 1 and 2 to each other will be determined. The multiple of the signals is necessary for profiles having spiral-formed generatrix. In this case, a fractional number is the ratio of the rotational speeds as mentioned above. Therefore, main spindle 1 should be used as a reference since its moment if inertia is greater than that of eccentric spindle 2 and, thus, it is easier to regulate the position of spindle 2. In this way, the pulse arriving from main spindle 1 should proportionally be multiplied. In the described exemplatory embodiment, proportionally be multiplied. In the described exemplatory embodiment, the multiplier circuit of multiplier-divider 34 produces the desired number of pulses in the case of every pulse arriving from pulse generator 20 attached to main spindle 1. If a multiplication with 5 is required, multiplier-divider 34 gives five pulses when one pulse reaches it from pulse generator 20 (through program unit 30). In this case, the workpiece 5 will have a pentagonal profile with straight lined generatrix.

If a profile with spiral-formed generatrix is required, a division is to be carried out. The pitch of the spiral will be determined by the feed motion. If the value of the fraction of the numbers of revolutions and the feed motion is constant, the pitch of the spiral will also be constant but if only one of them is changing in dependency of the time or the angular displacement, the pitch of the spiral will also be changing. The value of the fraction will be produced by a multiplication with the value of the numerator of the fraction and by a division of the multiplied value with the value of the nominator of the fraction. The divided value will further be used.

Because of the technology of cutting or grinding, the main spindle 1 must be rotated with different angular speeds. Therefore, the synchronization of rotations of spindles 1 and 2 for maintaining the required relationship between them must be made possible with chaning angular velocities of main spindle 1, too. Thus, in the control circuitry, not only the number of pulses but also their frequency must be processed. For this, the signals coming from multiplier-divider 34 is forwarded into divider 35 as well as into counter 38. In divider 35, the pulsating signals coming from multiplier-divider 34 must be divided and processed for having a frequency pattern which is suitable for converting the signals from frequency into voltage. Nevertheless, because of the multiplication-division, a signal with higher frequency will superimpose the basic frequency which, in turn, is proportional to the number of revolutions. The conversion is not possible with linear means, therefore, according to the invention, the composite signal will be divided and, which will resulting a signal near to the idealistic one.

In this way, a voltage level being always proportional to the number of revolutions will be forwarded to summator 37. For providing a signal being proportional to the actual angle position, the signals from multiplier-divider 34 will be forwarded to the direct input of reversible counter 38, the number of which being proportional to the angle displacement of eccentric spindle 2. At the same time, a sequence of pulses being proportional to the angle displacement is forwarded from pulse generator 21 to the inverse input of counter 38. In this way, the actual content of the counter 38 will always be proportional to the angle error of the displacement. Through D/A converter 39, a voltage being proportional to the angle error and having a negative or positive sense will be obtained depending on the fact that the actual position of eccentric spindle 2 is in retard or is fast in respect to main spindle 1. If the difference between the rotational positions corresponds to what have been adjusted, then counter 38 is empty, thus, it won't be forwarded any signal to summator 37. If the system loses this balanced state upon the impact of e.g. any disturbance, the number of pulses arriving from pulse generator 21 will be more or less than that arriving from multiplier-divider 34 and the content of counter 38 will change according to this difference. If eccentric spindle 2 accelerated (is fast in phase) in respect to main spindle 1, the content of counter 38 changes in negative sense in accordance with this change. With this, the output voltage of A/D converter 39 changes also in negative sense which makes the output signal of summator 37 smaller. The same process can be observed but in positive sense if motor 9 gets slower (is in retard in phase) in respect to motor 8 of main spindle 1.

But if the frequency of the signals coming from multiplier-divider 34 enlarges (main spindle 1 accelerates), the output voltage level of converter 36 will be higher and, at the beginning, the output signal of D/A converter 37 will also change in positive direction, and the more positive signal coming from summator 37 accelerates motor 9. When the speed required with respect to the given relationship between the rotations of spindles 1 and 2 is reached, the stable operation can further be maintained. The same process can be observed when main spindle 1 gets slower.

Nevertheless, the signals of counter 38 can be used for signalising an error in the system, since these signals can be visualized on a display. Through this, the operator can gain direct information about the operational conditions of the working machine. These signals can also be recorded.

Figure 4:
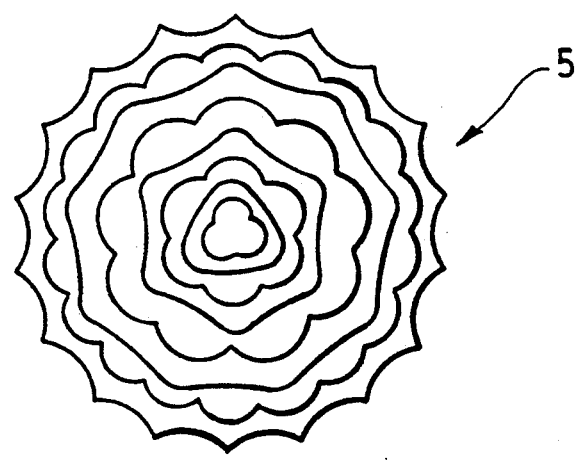
Figure 5:
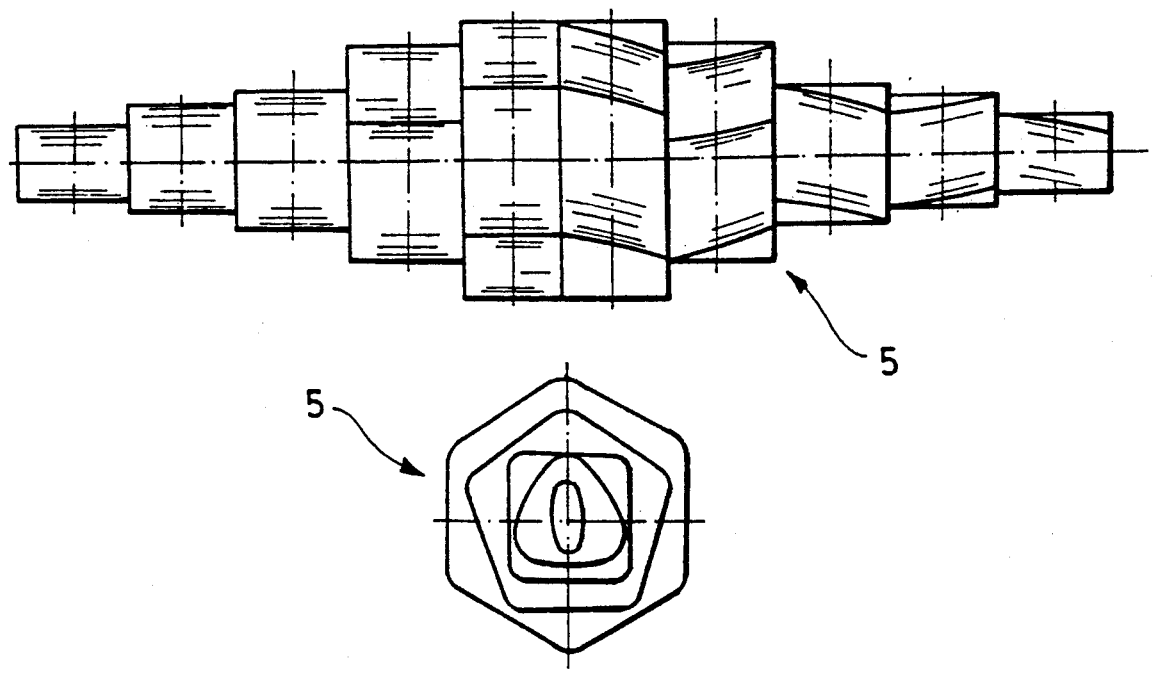

The function of multiplier-divider 34 can be influenced by central program unit 30. With this, the rotational speed or the angular disposition of eccentric spindle 2 can proportionally be modified in respect to the rotational speed and angular position of main spindle 1. This is the principal basis for the technology of production of the bodies of revolution with modified polygonal profiles. This permits an extremely wide range of workpieces 5 to be produced according to this invention. FIG. 4 illustrates some of the polygon profiles which can be generated by the method and working machine of this invention. The profiles differ in the number of "corners" and in the shape of the generatrix of the profiles. The same will be apparent from the example of the shaft as shown in FIG. 5.

As the experiments in connection with the method and the working machine as in this invention have shown, the variation possibilities of the profiles are nearly unlimited for outer surfaces as well as for inner surfaces, too. With the aid of the electronic control circuitry as in this invention, the rotational movement can be controlled by an optional program, the technological parameters can be set quickly and easily. The working accuracy is extremely high since with the change of the rotational speed of main spindle 1, that of eccentric spindle 2 will be changed simultaneously by maintaining the angular relationship between them. The technological parameters can be modified during the operation of the working machine. Of course, all further deficiencies adhered to the gear drives won't occur. Further to this, the electronical system as in this invention can easily be attached for other working machines having numerical control.

What is claimed is:

1. A method for producing a workpiece with surfaces of non-circular but regular cross section, comprising
   (a) rotating a workpiece having an axis of symmetry about a first axis which is said axis of symmetry;
   (b) simultaneously rotating said workpieces so that said first axis revolves about a second axis spaced from and parallel to said first axis;
   (c) providing a mechanically independent relationship between the rotation of the workpiece about said first axis and the rotation of the workpiece so that first axis revolves about said second eccentric axis;
   (d) providing an electronic control for maintaining said relationship between said rotations;
   (e) entering data into said electronic control for influencing the relationship of said rotation and revolution according to a cross-section to be machined on said workpiece;
   (f) monitoring and feeding-back data of said rotation and revolution into said electronic control for providing the desired cross-section to be machined on the workpiece; and
   (g) applying a machining tool to the workpiece to machine on the workpiece said desired cross-section upon rotation and revolution of the workpiece.

2. A method as claimed in claim 1, wherein said tool for machining the surface of the workpiece is driven with a feed motion relative to the workpiece.

3. A method as claimed in claim 1, wherein said relation between rotation of the first axis and revolution of the second axis is such that the number of one is a whole-number multiple of the other.

4. A method as claimed in claim 1, wherein said relation between rotation of the first axis and revolution of the second axis is such that the number of one is a fractional-number multiple of the other.

5. A method as claimed in claim 1, wherein said relation between rotation of the first axis and revolution of the second eccentric axis is such that the number of one is a continuously-changing-number multiple of the other.

6. A method as claimed in claim 1, wherein each of the first axis and the second axis has a moving reference point movable therewith, and the moving reference points are related to stationary reference points, respectively, and for establishing said relation between rotations of the first rotational axis and the second eccentric axis, the moving reference point of one of the first axis and second axis is a given angle away form the corresponding stationary reference point and the moving reference point of the other of the first and second axes is in alignment with the corresponding stationary reference point, in a starting position of the axes.

* * * * *